United States Patent
Minemura

(10) Patent No.: US 7,102,578 B2
(45) Date of Patent: Sep. 5, 2006

(54) RADIO APPARATUS

(75) Inventor: Takashi Minemura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/138,846

(22) Filed: May 25, 2005

(65) Prior Publication Data

US 2006/0055608 A1   Mar. 16, 2006

(30) Foreign Application Priority Data

Sep. 16, 2004   (JP)   ............... 2004-270256

(51) Int. Cl.
*H01Q 1/24*   (2006.01)
(52) U.S. Cl. ...................................... 343/702
(58) Field of Classification Search .............. 343/702
See application file for complete search history.

(56) References Cited

U.S. PATENT DOCUMENTS

| | | | | |
|---|---|---|---|---|
| 6,486,834 B1 * | 11/2002 | Tsai | ........................... | 343/702 |
| 6,600,450 B1 * | 7/2003 | Efanov et al. | ............... | 343/726 |
| 6,963,310 B1 * | 11/2005 | Horita et al. | ............... | 343/702 |
| 7,009,567 B1 * | 3/2006 | Iwai et al. | .................. | 343/702 |

FOREIGN PATENT DOCUMENTS

JP   2004-56426 A   2/2004

OTHER PUBLICATIONS

Article entitled: An Antenna System with Two Parallel Elements and a Dividing Feed Circuit for a Handy Phone, T. Nishikido, et al, IEICE Communications Society Conference B-1-190, The Institute of Electronics, Information and Communications Engineers, Sep. 2003.

* cited by examiner

*Primary Examiner*—Tho Phan
(74) *Attorney, Agent, or Firm*—Frishauf, Holtz, Goodman & Chick, P.C.

(57) ABSTRACT

There is provided a radio apparatus having a built-in type antenna of a broad frequency range in a thin case. The radio apparatus comprises a fist case containing a first printed circuit board (PCB) and a second case containing a second PCB. The two cases are joined by a hinge part. A radio circuit is contained in the first or the second case or the hinge part, and is connected to a first end of a feeder line including a signal line and a return line. A first antenna element formed as a printed pattern of the first PCB is connected, by a first conductor, to the signal line at a feeding point, i.e., a second end of the feeder line. A second antenna element formed as a printed pattern of the second PCB is connected, by a second conductor, to the return line at the feeding point.

20 Claims, 13 Drawing Sheets

RADIO APPARATUS

CROSS REFERENCE TO RELATED APPLICATIONS

This application is based upon and claims the benefit of priority from the prior Japanese Patent Application No. 2004-270256 filed on Sep. 16, 2004; the entire contents of which are incorporated herein by reference.

FIELD OF THE INVENTION

The present invention relates to a radio apparatus having an antenna.

DESCRIPTION OF THE BACKGROUND

More and more radio apparatuses like mobile phones are used for various applications as radio communication technologies remarkably grow these days. A recent trend to be noted is a radio apparatus of multiple uses, i.e., ordinary voice and data communications plus receiving digital TV broadcasting or short-range radio links. Such a radio apparatus is required to have a broader frequency range than conventional ones, and this trend is pushed forward by developing ultra-wide-band (UWB) technologies.

Broadening a frequency range of a radio apparatus needs broadening a frequency range of each component, and especially broadening a frequency range of an antenna is required. Otherwise a radio apparatus of multiple uses is equipped with a plurality of conventional antennas of narrow frequency ranges (narrow-band antennas) and is greater in size and more complicated in its configuration than that of a single use. Such a radio apparatus having two or more narrow-band antennas is inconvenient to use or handle as a narrow-band antenna such as a whip antenna generally sticks out of a case of the radio apparatus.

Known is a conventional radio apparatus that uses a plane-shaped conductor, e.g., a printed pattern of a printed circuit board (PCB) contained therein as a built-in type antenna element. An example of such a conventional radio apparatus is disclosed in the following reference: Nishikido, T. et al, "An antenna system with two parallel elements and a dividing feed circuit for a handy phone", IEICE Communications Society Conference B-1-190 (in Japanese), The Institute of Electronics, Information and Communication Engineers, September 2003.

Another example is disclosed in Japanese Patent Publication of Unexamined Applications (Kokai), 2004-56426, the English version of which is available on a website named "Intellectual Property Digital Library" linked from the Japan Patent Office website.

This conventional radio apparatus is a folding mobile phone called a clamshell type, and has an upper case containing an upper antenna element and a lower case containing a lower antenna element. Those antenna elements form a dipole antenna together, and its radiation characteristic is variably controlled with the shapes of the antenna elements and variations of inter-element connections.

This configuration, however, still has a disadvantage that the dipole antenna needs a balanced feed system that does not match an ordinary radio circuit having an unbalanced antenna connecting port and thus needs a converter. It has another disadvantage that the upper antenna element and a ground plane of the upper case are in plural layers, which makes a thinner case design difficult.

A mobile phone of a clamshell type is used for communications while its upper and lower cases are being closed as well as while they are being opened. An antenna and a feed system of such a mobile phone needs impedance matching whether the cases are being opened or closed. For the conventional configurations described above, it is difficult to meet such a need.

SUMMARY OF THE INVENTION

According to a first aspect of the present invention, there is provided a radio apparatus comprising a fist case containing a first printed circuit board, a second case containing a second printed circuit board, a hinge part joining the first case and the second case, the first case and the second case being configured to open and close to each other, a radio circuit being contained in one of the first case, the second case and the hinge part, a feeder line being connected to the radio circuit at a first end thereof, having a feeding point at a second end thereof, and including a signal line and a return line between the first end and the second end, a first antenna element being formed as a printed pattern of the first printed circuit board, a first conductor connecting the first antenna element to the signal line at the feeding point, a second antenna element being formed as a printed pattern of the second printed circuit board, and a second conductor connecting the second antenna element to the return line at the feeding point.

DETAILED DESCRIPTION OF THE INVENTION

Figure 1:
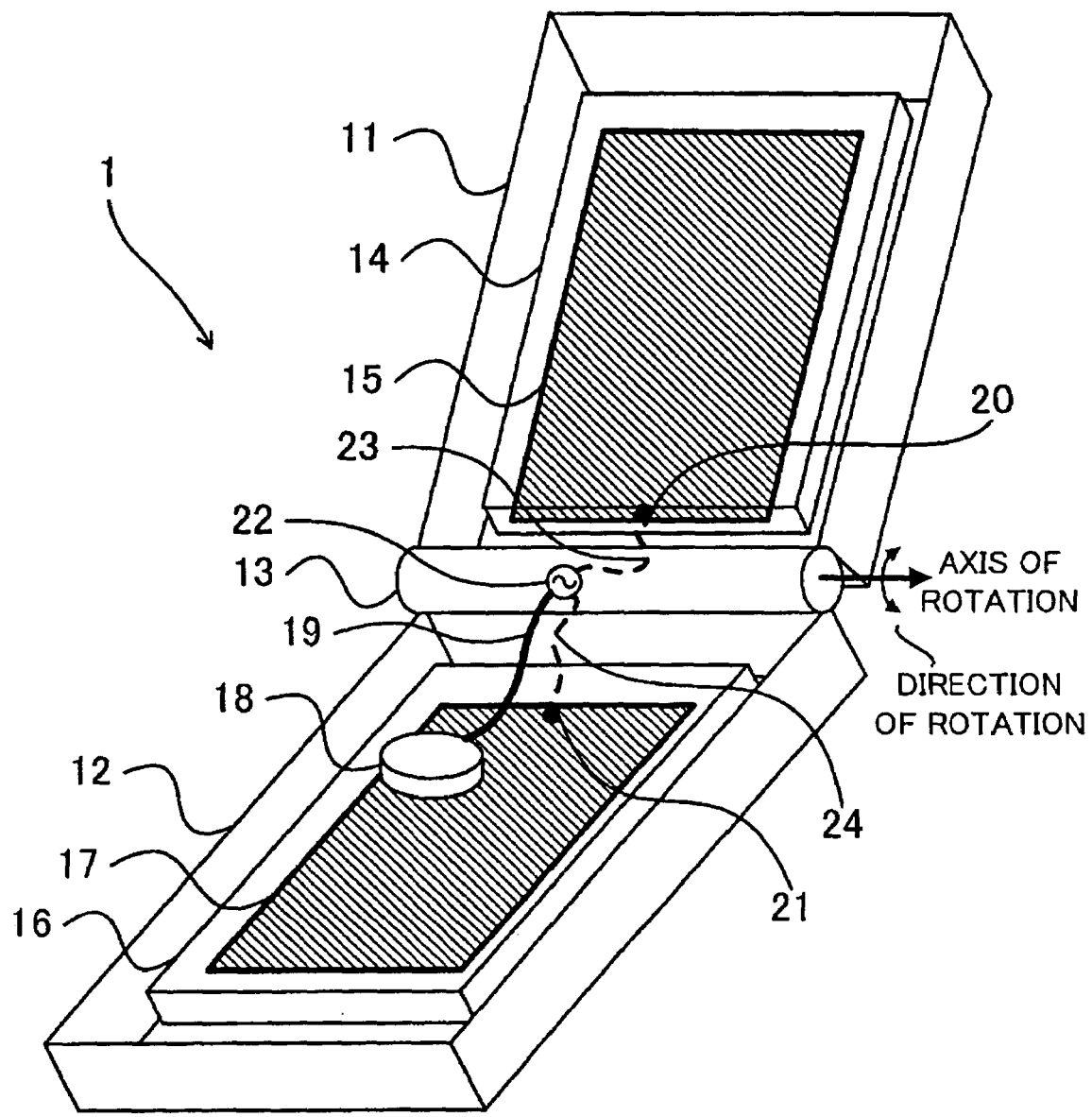
FIG. 1 illustrates a configuration of a main part of a radio apparatus in a first embodiment of the present invention.

A first embodiment of the present invention will be described with reference to FIG. 1 through FIG. 4. FIG. 1 is a perspective view of a main part of a radio apparatus 1 in the first embodiment. The radio apparatus 1 has a first case 11, a second case 12 and a hinge part 13.

The first case 11 and the second case 12 are joined via the hinge part 13 and configured to open and close to each other in a manner that the first case 11 rotates against the second case 12 around an axis of rotation, which is parallel to a side of the first case 11 joined to the hinge part 13. The axis and a direction of that rotation are shown in FIG. 1. The hinge part 13 may be provided with another axis of rotation (not shown) so that the first case 11 may be turned over and closed to the second case 12.

FIG. 1 shows an internal configuration of the first case 11 that contains a first printed circuit board (PCB) 14 having a first antenna element 15 formed as a printed pattern of the first PCB 14. The first antenna element 15 may be formed as a ground pattern of the first PCB 14. The first antenna element 15 may be formed on the front or the back face of the first PCB 14, or in a case where the first PCB 14 is multiple-layered, on a middle layer.

FIG. 1 shows an internal configuration of the second case 12 that contains a second PCB 16 having a second antenna element 17 formed as a printed pattern of the second PCB 16. The second antenna element 17 may be formed as a ground pattern of the second PCB 16. The second antenna element 17 may be formed on the front or the back face of the second PCB 16, or in a case where the second PCB 16 is multiple-layered, on a middle layer.

A radio circuit 18 is contained in the second case 12, e.g., mounted on the second PCB 16, as shown in FIG. 1. The radio circuit 18 may include a transmitter or a receiver, or both. The radio circuit 18 may be formed by one or more elements and is drawn as a single element in FIG. 1 to be easily understood. The radio circuit 18 may be interpreted as a transmitter or a receiver in the following description due to the reciprocal nature of antennas. The radio circuit 18 may be contained not in the second case 12 but in the first case 11 or in the hinge part 13.

In FIG. 1, a feeder line 19 is connected to the radio circuit 18 and goes toward the hinge part 13. The feeder line 19 may be formed by a microstrip line on the PCB 16 and a coaxial cable connected to the microstrip line in series within the PCB 16, or by a coaxial cable alone, and is connected to the radio circuit 18 as described later in detail. The first antenna element 15 has a first connecting spot 20. The second antenna element 17 has a second connecting spot 21. The feeder line 19 ends at a feeding point 22.

The feeding point 22 feeds radio signals through a first connecting member, a first flexible wire 23 e.g., via the first connecting spot 20 to the first antenna element 15. Its return path is from the second antenna element 17, via the connecting spot 21 and through a second connecting member, a second flexible wire 24 e.g., to the feeding point 22.

The feeding point 22 may be fixed on another PCB (not shown) to make the connections from or to the feeding point 22 steady and stable. In such a case, the first antenna element 15 and the PCB having the feeding point 22 is connected by the first flexible wire 23, and the second antenna element 17 and the PCB having the feeding point 22 is connected by the second flexible wire 24.

Figure 2:
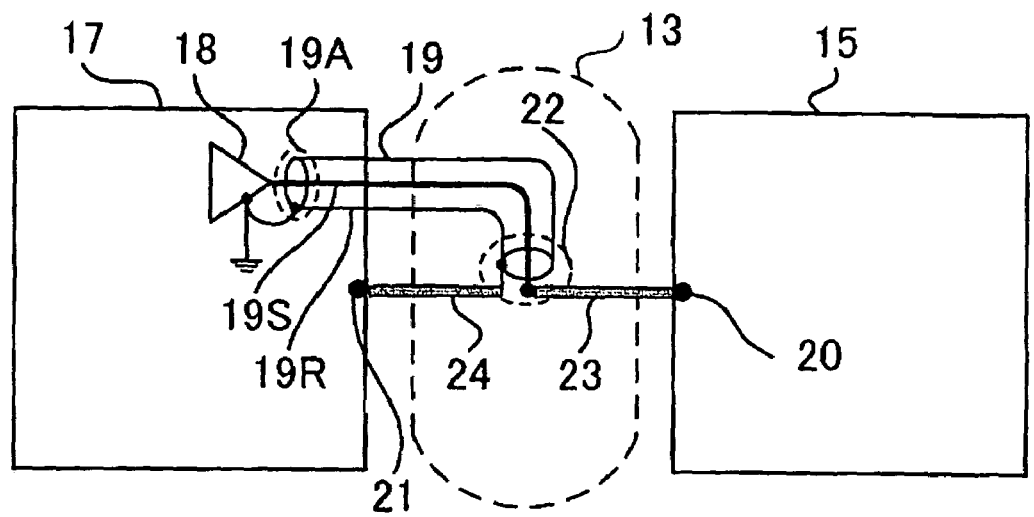
FIG. 2 is a schematic diagram of connections around a feeding point in the first embodiment.

An example of connections among the radio circuit 18, the first connecting spot 20, the second connecting spot 21 and the feeding point 22 will be described in detail with reference to FIG. 2, a schematic diagram illustrating those connections. Each of portions given the reference numeral 13, 15 or 17 through 24 is a same as the corresponding one shown in FIG. 1, and its explanation is omitted. Neither the first case 11 nor the second case 12 are shown in FIG. 2.

The feeder line 19 is connected to the radio circuit 18 at an end thereof, 19A, and the other end thereof is the feeding point 22. The feeder line 19 includes a signal line 19S, e.g. an inner conductor of a coaxial cable, and a return line 19R, e.g. an outer conductor of the coaxial cable.

In FIG. 1, the feeder line 19 and the second flexible wire 24 are shown separately so that the connections including them may be easily understood. The feeder line 19 and the second flexible wire 24 may be closely arranged or bound together. Such binding may be practically useful and causes no problems as the radio circuit 18 and the second connecting spot 21 have an equal electrical potential.

The signal line 19S is connected to the first flexible wire 23 at the feeding point 22, and the first flexible wire 23 is connected to the first antenna element 15 at the first connecting spot 20. The return line 19R is connected to the second flexible wire 24 at the feeding point 22, and the second flexible wire 24 is connected to the second antenna element 17 at the second connecting spot 21. The feeding point 22 is in the hinge part 13. These relations are shown in FIG. 2 by a dashed line of the hinge part 13 encircling a dashed line of the feeding point 22 and the connections to the first and the second flexible wires 23 and 24 thereat.

Figure 3:
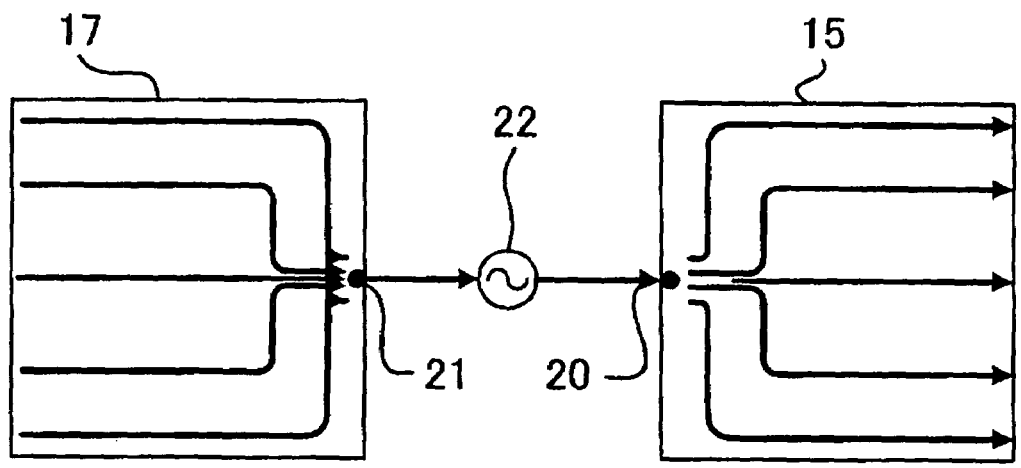
FIG. 3 illustrates an antenna current distribution in the configuration shown in FIG. 2.

An antenna current distribution in the above configuration will be described with reference to FIG. 3. Each of portions shown in FIG. 3 is a same as the corresponding one shown in FIG. 1, and its explanation is omitted. A radio signal supplied by the radio circuit 18 is fed from the feeding point 22 via the first connecting spot 20 into the first antenna element 15, which is drawn by solid lines each of which is shown by an arrow. As the first antenna element 15 has a certain width, the antenna current of the radio signal is divided and flows along several paths in the first antenna element 15 having various path lengths.

As the second antenna element 17 also has a certain width, the return current of the radio signal is divided and flows along several paths in the second antenna element 17 having various path lengths. An antenna formed by the first antenna element 15 and the second antenna element 17 has a plurality of resonant frequencies determined by those various path lengths. Accordingly, the antenna may have a frequency range broader than an ordinary monopole or dipole antenna e.g., which is an advantage of the radio apparatus 1.

Another example of connections among the radio circuit 18, the first connecting spot 20, the second connecting spot 21 and the feeding point 22 will be described in detail with reference to FIG. 4. Each of portions given the reference numeral 13, 15, 17 through 22 or 19A/19S/19R is a same as the corresponding one shown in FIG. 2, and its explanation is omitted.

Figure 4:
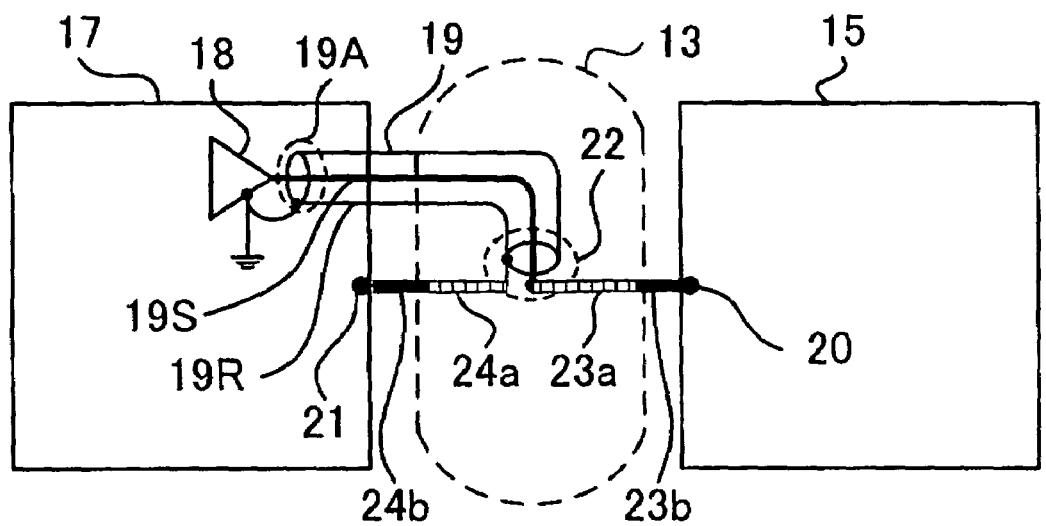
FIG. 4 is a schematic diagram of connections around the feeding point in a variation of the first embodiment.

In FIG. 4, the feeder line 19 is connected to the radio circuit 18 as it is in FIG. 2. The signal line 19S and the first antenna element 15 are connected between the feeding point 22 and the first connecting spot 20 by a conductor including a first portion 23a and a second portion 23b more flexible than the first portion 23a. The return line 19R and the second antenna element 17 are connected to each other between the feeding point 22 and the second connecting spot 21 by another conductor similarly having a first portion 24a and a second portion 24b which is more flexible than the first portion 24a.

In the above configuration, the first portions 23a and 24a may be made rigid, and most part of the connection between the first connecting spot 20 and the second connecting spot 21 across the feeding point 22 may not change its shape, whether the first and the second cases 11 and 12 are opened or closed. This feature provides the radio apparatus 1 with another advantage that its antenna characteristic is not affected much by opening or closing the first and the second cases 11 and 12. In FIG. 4, either one of the conductors on both sides of the feeding point 22 may be replaced by, e.g. the first or the second flexible wire 23 or 24 shown in FIG. 2.

Going back to FIG. 1, possible variations of the shapes of the first antenna element 15 and the second antenna element 17 will be described. In FIG. 1, the first case 11 and the second case 12 are shown as a rectangular parallelepiped box. The first PCB 14 and the second PCB 16 are shaped rectangular, and so are the first antenna element 15 and the second antenna element 17.

The first antenna element 15 may be shaped flat on a plane and symmetric about an axis of symmetry included in the plane and perpendicular to the axis of rotation. Due to this type of shaping, a radiation pattern of the first antenna elements 15 may be shaped symmetric around the axis of symmetry. The second antenna element 17 and its radiation pattern may be shaped alike.

The first antenna element 15 may not be shaped symmetric around the axis of symmetry though, in a case where such a symmetric radiation pattern is not needed. The second antenna element 17 may not be either. The first antenna element 15 or the second antenna element 17 may not be shaped flat on a plane but may be shaped uneven or may include ramps in it. They may not be shaped rectangular, but may be shaped in variety.

According to the first embodiment described above, the cases of the radio apparatus 1 may be made thinner and its antenna frequency range may be made broader than conventional ones by using the PCB ground patterns as the antenna elements. The shape of the connections from/to the feeding point may not be affected much by opening or closing the cases so that the antenna characteristic is stable.

A second embodiment of the present invention will be described with reference to FIG. 5 and FIG. 6. A radio apparatus in the second embodiment adopts a same configuration as the configuration of the radio apparatus 1 in the first embodiment shown in FIG. 1 that is referred to as necessary, except for connections around the feeding point 22.

Figure 5:
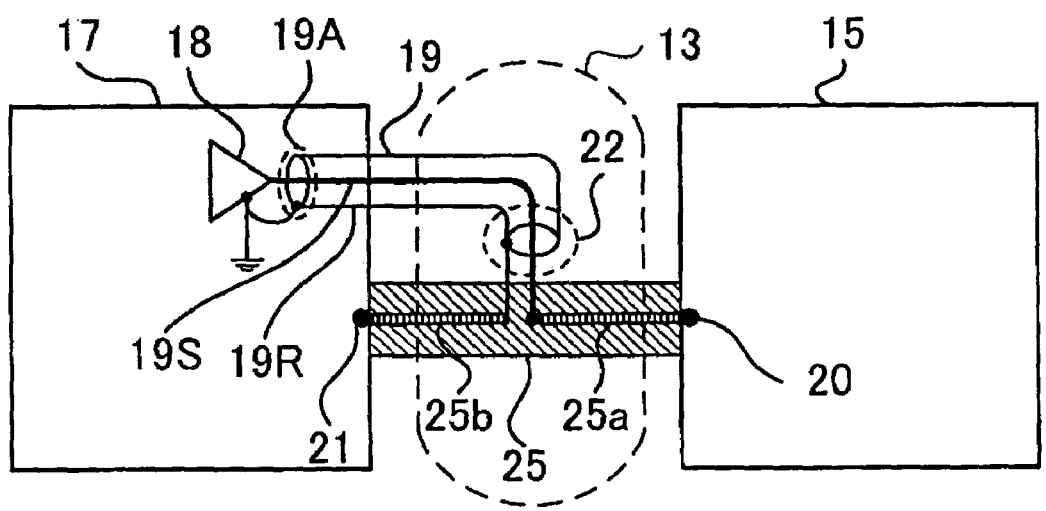
FIG. 5 is a schematic diagram of connections around a feeding point in a second embodiment of the present invention.

FIG. 5 is a schematic diagram of an example of such connections. Each of portions given the reference numeral 13, 15, 17 through 19, 19A/19S/19R or 20 through 22 is a same as the corresponding one shown in FIG. 2, and its explanation is omitted. In FIG. 5, shown is a flexible PCB 25 to connect the first PCB 14 (not shown) and the second PCB 16 (not shown) through the hinge part 13.

The signal line 19S is connected to a first printed pattern 25a of the flexible PCB 25 at the feeding point 22, and the first printed pattern 25a is connected to the first antenna element 15 at the first connecting spot 20. The return line 19R is connected to a second printed pattern 25b at the feeding point 22, and the second printed pattern 25b is connected to the second antenna element 17 at the second connecting spot 21.

In FIG. 5, the first antenna element 15 and the second antenna element 17 form an antenna equivalent to the antenna similarly formed in FIG. 2, while making use of a flexible PCB that is generally used in radio apparatus configurations with two cases. Either one of the first and the second printed patterns 25a or 25b may be replaced by, e.g. the first or the second flexible wire 23 or 24 shown in FIG. 2.

Figure 6:
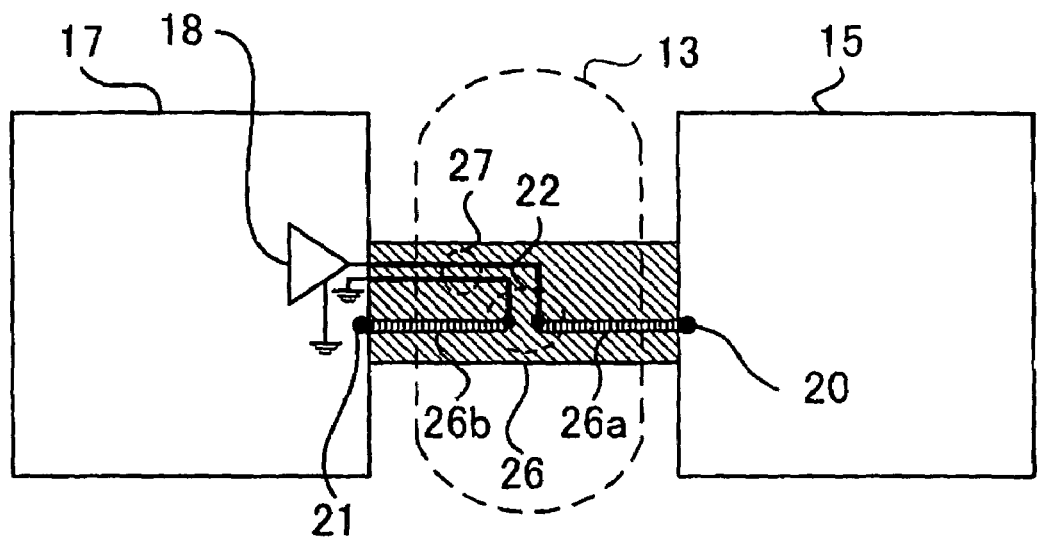
FIG. 6 is a schematic diagram of connections around the feeding point in a variation of the second embodiment.

FIG. 6 is a schematic diagram of another example of connections around the feeding point 22 in the second embodiment. Each of portions given the reference numeral 13, 15, 17, 18 or 20 through 22 is a same as the corresponding one shown in FIG. 2, and its explanation is omitted. In FIG. 6, shown is a flexible PCB 26 to connect the first PCB 14 (not shown) and the second PCB 16 (not shown) through the hinge part 13.

The flexible PCB 26 has a first printed pattern 26a to connect the first antenna element 15 and the feeding point 22 for a signal connection, and has a second printed pattern 26b to connect the second antenna element 17 and the feeding point 22 for a return connection.

The flexible PCB 26 includes a microstrip line 27 formed as a printed pattern and connected to the radio circuit 18 at an end thereof, and the other end of the microstrip line 27 is the feeding point 22. The microstrip line 27 includes a signal line and a return line.

The signal line of the microstrip line 27 is connected to the first printed pattern 26a at the feeding point 22, and the first printed pattern 26a is connected to the first antenna element 15 at the first connecting spot 20. The return line of the microstrip line 27 is connected to the second printed pattern 26b at the feeding point 22, and the second printed pattern 26b is connected to the second antenna element 17 at the second connecting spot 21. At least one of the first and the second printed patterns 26a or 26b may be replaced by, e.g. the first or the second flexible wire 23 or 24 shown in FIG. 2.

In FIG. 6, the first antenna element 15 and the second antenna element 17 form an antenna equivalent to the antenna similarly formed in FIG. 5 without a need of the feeder line 19 shown in FIG. 5. In FIG. 5 or FIG. 6, the flexible PCB 25 or 26 may be variously shaped, e.g., like a crank-like flexible PCBs generally used in clamshell-type mobile phones.

According to the second embodiment described above, an antenna equivalent to each of the antennas formed by the first and the second antenna elements 15 and 17 in the first embodiment may be configured by making use of a generally used flexible PCB.

A third embodiment of the present invention will be described with reference to FIG. 7 and FIG. 8. A radio apparatus in the third embodiment adopts a same configuration as the configuration of the radio apparatus 1 in the first embodiment shown in FIG. 1, that is referred to as necessary, except for connections around the feeding point 22.

Figure 7:
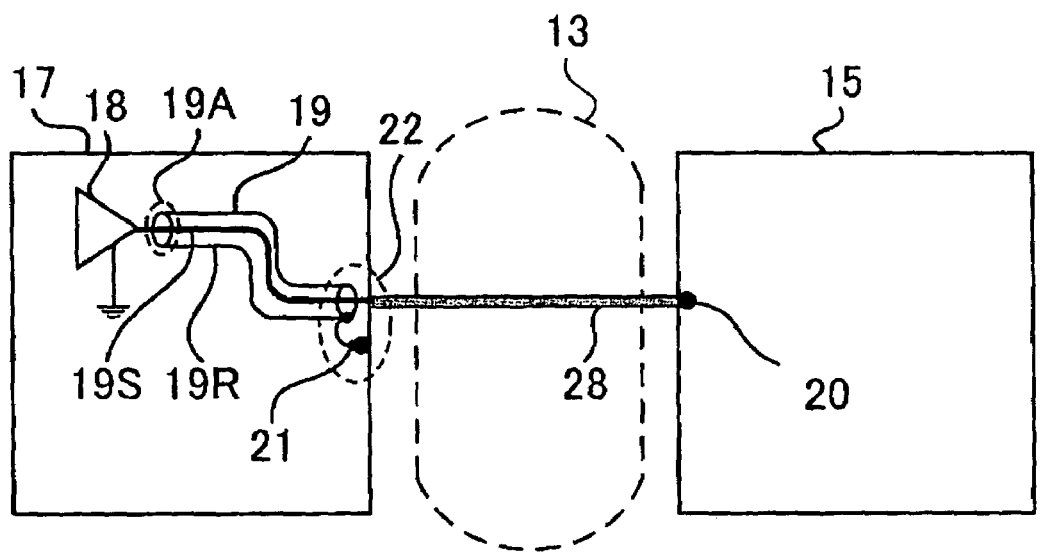
FIG. 7 is a schematic diagram of connections around a feeding point in a third embodiment of the present invention.

FIG. 7 is a schematic diagram of an example of such connections. Each of portions given the reference numeral 13, 15, 17, 18, 19, 19A/19S/19R or 20 through 23 is a same as the corresponding one shown in FIG. 2, and its explanation is omitted. The location of the feeding point 22 is different from the location of the feeding point 22 in FIG. 2, i.e., the feeding point 22 is not in the hinge part 13 but near the second connecting spot 21 in FIG. 7. The signal line 19S is connected to a flexible wire 28 at the feeding point 22, and the flexible wire 28 is connected to the first antenna element 15 at the first connecting spot 20. The flexible wire 28 crosses the hinge part 13. The return line 19R is directly connected to the second antenna element 17 at the second connecting spot 21.

In FIG. 7, the first antenna element 15 and the second antenna element 17 form an antenna equivalent to the antenna similarly formed in FIG. 2, as the shift of the location of the feeding point 22 gives little effect to the antenna characteristic. Due to this configuration, pulling the feeder line 19 into the hinge part 13 is not necessary, and that helps easier wiring. This configuration may be applied in a case where the hinge part 13 is provided with another axis of rotation so that the first case 11 may be turned over and closed to the second case 12.

Figure 8:
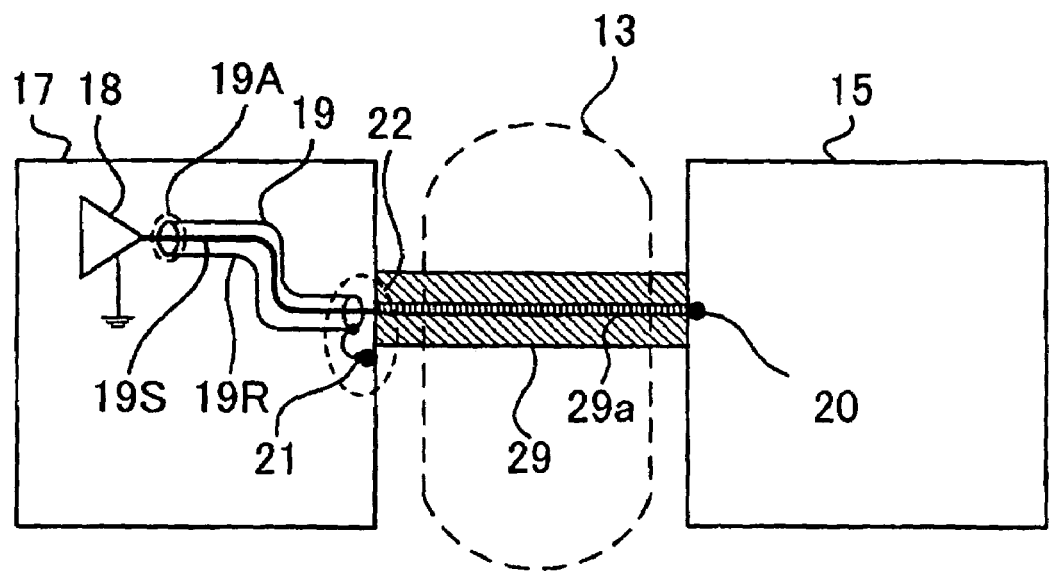
FIG. 8 is a schematic diagram of connections around the feeding point in a variation of the third embodiment.

FIG. 8 is a schematic diagram of another example of the connections around the feeding point 22 in the third embodiment. Each of portions given the reference numeral 13, 15, 17, 18, 19, 19A/19S/19R or 20 through 22 is a same as the corresponding one shown in FIG. 2, and its explanation is omitted. In FIG. 8, shown is a flexible PCB 29 to connect the first PCB 14 (not shown) and the second PCB 16 (not shown) through the hinge part 13.

The signal line 19S is connected to a printed pattern 29a of the flexible PCB 29 at the feeding point 22, and the printed pattern 29a is connected to the first antenna element 15 at the first connecting spot 20. The return line 19R is directly connected to the second antenna element 17 at the second connecting spot 21. In FIG. 8, the first antenna element 15 and the second antenna element 17 form an antenna equivalent to the antenna similarly formed in FIG. 7, while making use of a flexible PCB that is generally used in radio apparatus configurations with two cases.

According to the third embodiment described above, an antenna equivalent to each of the antennas formed by the first and the second antenna elements 15 and 17 in the first embodiment may be configured with simpler wiring around the feeding point 22.

A fourth embodiment of the present invention will be described with reference to FIG. 9. A radio apparatus in the fourth embodiment adopts a same configuration as the configuration of the radio apparatus 1 in the first embodiment shown in FIG. 1 that is referred to as necessary, except for an arrangement and connections around the radio circuit.

Figure 9:
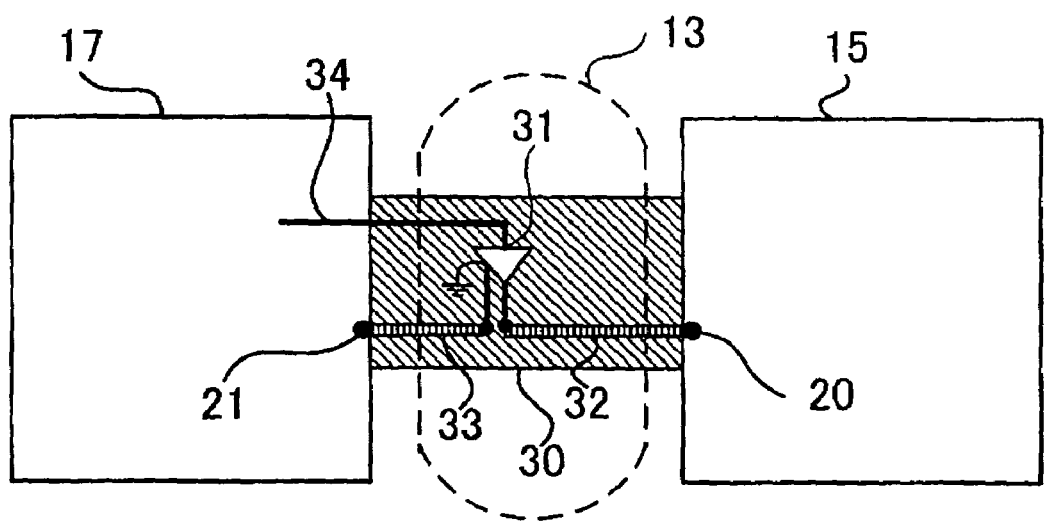
FIG. 9 is a schematic diagram of connections around a radio circuit in a fourth embodiment of the present invention.

FIG. 9 illustrates an arrangement of and connections among a radio circuit and PCBs of a radio apparatus in the fourth embodiment. In FIG. 9, each of portions given the reference numeral 13, 15, 17, 20 or 21 is a same as the corresponding one shown in FIG. 2, and its explanation is omitted. The first PCB 14 (not shown) and the second PCB 16 (not shown) are connected with a flexible PCB 30, and a radio circuit 31 is mounted on the flexible PCB 30. The flexible PCB 30 is, e.g., a rigid-flexible PCB that is configured to enable active or passive components to be mounted thereon.

The flexible PCB 30 has a first printed pattern 32 to connect the first connecting spot 20 and the radio circuit 31 for a signal connection, and has a second printed pattern 33 to connect the second connecting spot 21 and the radio circuit 31 for a return connection. A signal input may be applied to the radio circuit 30 from the second PCB 16, or possibly from the first PCB 14, through a signal line 34.

According to the fourth embodiment described above, an antenna equivalent to each of the antennas formed by the first and the second antenna elements 15 and 17 in the first embodiment may be configured with simpler wiring and reduced feeder loss.

Figure 10:
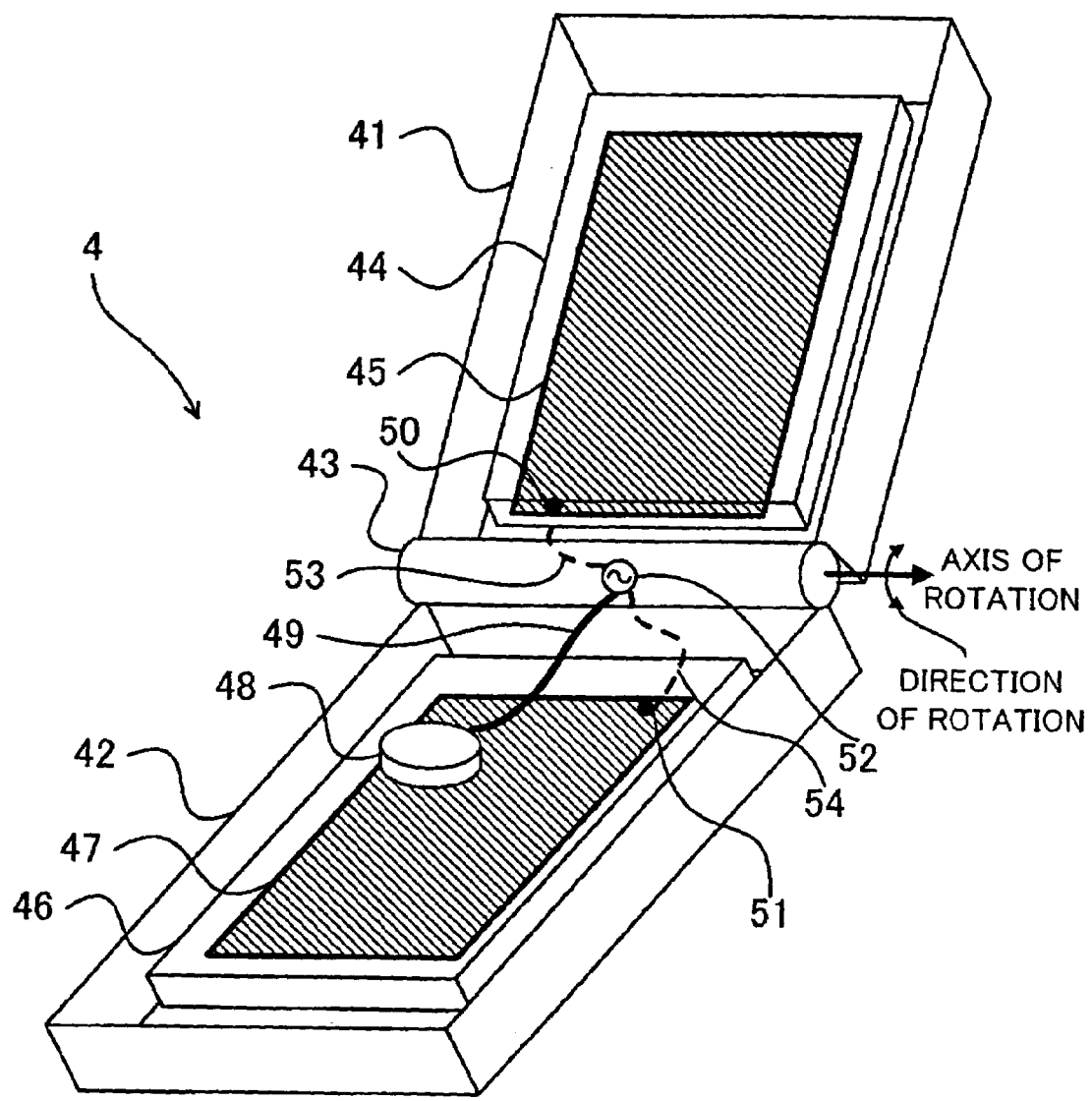
FIG. 10 illustrates a configuration of a main part of a radio apparatus in a fifth embodiment of the present invention.

A fifth embodiment of the present invention will be described with reference to FIG. 10 through FIG. 18. FIG. 10 is a perspective view of a main part of a radio apparatus 4 in the fifth embodiment. The radio apparatus 4 is usable in a frequency band, i.e., a band of use. The radio apparatus 4 has a first case 41, a second case 42 and a hinge part 43.

The first case 41 and the second case 42 are joined via the hinge part 43 and configured to open and close to each other in a manner that the first case 41 rotates against the second case 42 around an axis of rotation, which is parallel to a side of the first case 41 joined to the hinge part 43. The axis and a direction of that rotation are shown in FIG. 10. The hinge part 43 may be provided with another axis of rotation (not shown) so that the first case 41 may be turned over and closed to the second case 42.

FIG. 10 shows an internal configuration of the first case 41 that contains a first PCB 44 having a first antenna element 45 formed as a printed pattern of the first PCB 44. The first antenna element 45 may be formed as a ground pattern of the first PCB 44. The first antenna element 45 may be formed on the front or the back face of the first PCB 44, or in a case where the first PCB 44 is multiple-layered, on a middle layer.

FIG. 10 shows an internal configuration of the second case 42 that contains a second PCB 46 having a second antenna element 47 formed as a printed pattern of the second PCB 46. The second antenna element 47 may be formed as a ground pattern of the second PCB 46. The second antenna element 47 may be formed on the front or the back face of the second PCB 46, or in a case where the second PCB 46 is multiple-layered, on a middle layer.

The first antenna element 45 may be shaped flat on a plane, or almost flat although being shaped slightly uneven or including small ramps, like the first antenna element 15 in the first embodiment. The second antenna element 47 may be similarly shaped flat or almost flat. The first antenna element 45 and the second antenna element 47 may be placed parallel or almost parallel to each other when they are closed. The first or the second antenna element 45 or 47 may or may not be shaped symmetric about an axis of symmetry.

A radio circuit 48 is contained in the second case 42, e.g., mounted on the second PCB 46, as shown in FIG. 1. The radio circuit 48 is a same as the radio circuit 18 shown in FIG. 1, and may be contained not in the second case 42 but in the first case 41 or in the hinge part 43.

In FIG. 10, a feeder line 49 is connected to the radio circuit 48 and goes toward the hinge part 43. The feeder line 49 is a same as the feeder line 19 shown in FIG. 1, and is connected to the radio circuit 49 as described in the previous embodiments. The first antenna element 45 has a first connecting spot 50. The second antenna element 47 has a second connecting spot 51. The feeder line 49 ends at a feeding point 52.

The feeding point 52 feeds radio signals through a first connecting member, a first flexible wire 53 e.g., via the first connecting spot 50 to the first antenna element 45. Its return path is from the second antenna element 47, via the connecting spot 51 and through a second connecting member, a second flexible wire 54 e.g., to the feeding point 52. Connections among the first and the second antenna elements 45 and 47, the radio circuit 48 and the feeding point 52 may be arranged according to the previous embodiments.

Figure 11:
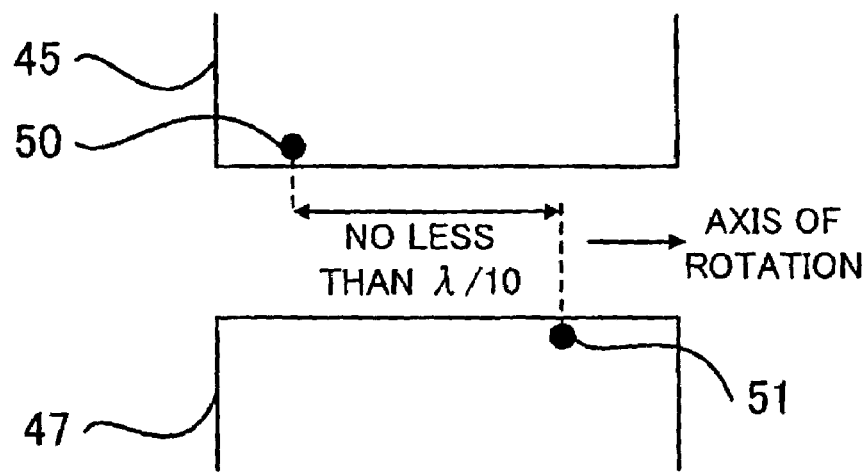
FIG. 11 illustrates a location of a second connecting spot relative to a first connecting spot in the fifth embodiment.

The first connecting spot 50 and the second connecting spot 51 are not in a face-to-face relation, while the first connecting spot 20 and the second connecting spot 21 may be in a face-to-face relation in FIG. 1. That relation will be described with reference to FIG. 11 and FIG. 12. In FIG. 11, shown is a part of the first antenna element 45 near the hinge part 43 including the first connecting spot 50, and so is a part of the second antenna element 47 near the hinge part 43 including the second connecting spot 51.

Assume a vector (not shown) from the first connecting spot 50 to the second connecting spot 51 in FIG. 11. The first and the second connecting spots 50 and 51 are located so apart that the value of one of a component of that vector parallel to the axis of rotation is no less than one-tenth wavelength of the highest frequency of the band of use. That relation of distance between the first and the second connecting spots 50 and 51 will be described in detail with reference to FIG. 12, a perspective view of the radio apparatus 4 similar to FIG. 10 and highlighting the relation of distance.

Figure 12:
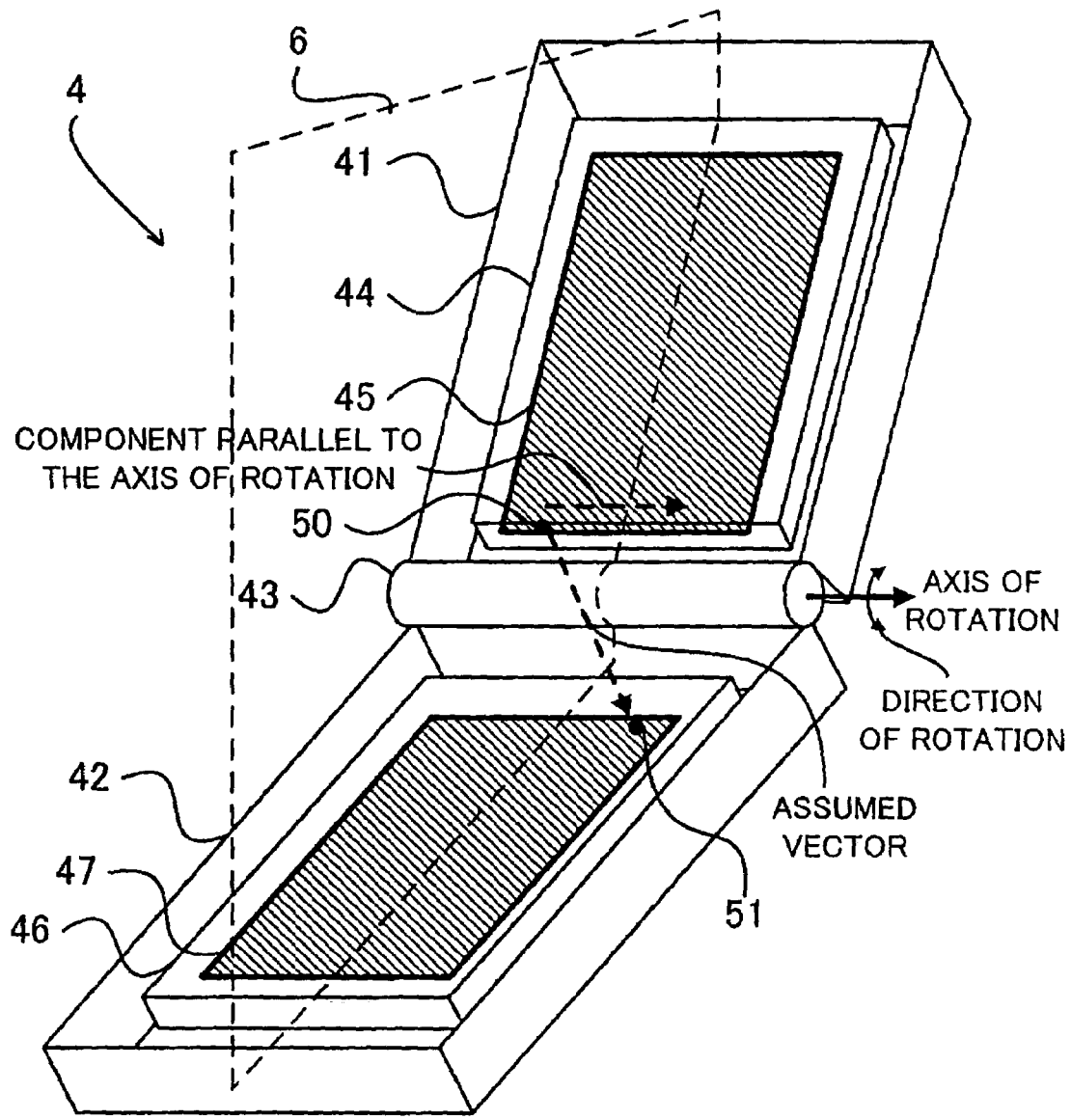
FIG. 12 illustrates a relation of distance between the locations of the first and the second connecting spots.

Each of portions shown in FIG. 12 is a same as the corresponding one shown in FIG. 10 given the same reference numeral. In FIG. 12, the radio circuit 48, the feeder line 49, the feeding point 52 and the first and the second flexible wires 53 and 54 are not shown for convenience of explanation. It is assumed in FIG. 12 that the first antenna element 45 and the second antenna element 47 are shaped flat or almost flat, and are placed parallel or almost parallel to each other when they are closed.

On that assumption, an imaginary plane 6 may be considered and drawn with a dashed line in FIG. 12. The imaginary plane 6 may be placed perpendicular to the first antenna element 45 and the second antenna element 47, to bisect the area of the first antenna element 45. In a case where the first antenna element 45 is shaped symmetric about an axis of symmetry perpendicular to the axis of rotation, the imaginary plane 6 cuts the first antenna element 45 along the axis of symmetry. The imaginary plane 6 may be placed to bisect the area of the second antenna element 47.

In FIG. 12, the first connecting spot 50 is located on one side of the imaginary plane 6, and the second connecting spot 51 is located on the other side of the imaginary plane 6. The vector from the first connecting spot 50 to the second connecting spot 51 thus has a component being parallel to the axis of rotation and having a nonzero value.

Figure 13:
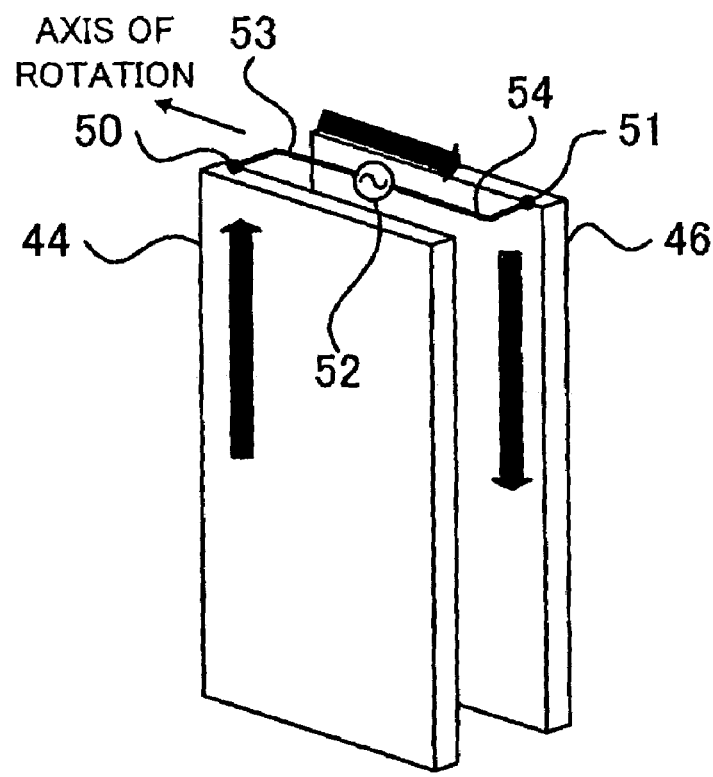
FIG. 13 illustrates a main path of an antenna current in the fifth embodiment.

An effect of this configuration will be described with reference to FIG. 13, that illustrates connections among each portion of the radio apparatus 4 in a case where the first case 41 and the second case 42 (both are not shown) are closed to each other. FIG. 13 illustrates a main path of an antenna current in this configuration. Each of portions in FIG. 13 is a same as the corresponding one shown in FIG. 10 given the same reference numeral, and its explanation is omitted.

In FIG. 13, each of the first and the second flexible wires 53 and 54 is L-shaped and forms an antenna element other than the first and the second antenna elements 45 and 47, which is mainly in a direction parallel to the axis of rotation. Consequently the main path of the antenna current is formed by three sub-paths in series and each is shown in FIG. 13 by three arrows.

The first sub-path is along a side of the first PCB 44 from the lower end thereof to the first connecting spot 50, the second one is along the flexible wires 53 and 54 across the feeding point 52 and the third one is along a side of the second PCB 46 from the second connecting spot 51 to the lower end thereof.

In a case where the first and the second cases 41 and 42 are closed to each other, the first and the third sub-paths are in opposite directions, and radiation from each sub-path cancels to each other. The second sub-path has no counterpart in the opposite direction and effectively contributes to radiation.

There are at least three antenna resonant frequencies, the first one determined by the length of the part of the first and the second flexible wires 53 and 54 parallel to the axis of rotation, the second one determined by the whole length of the first and the second flexible wires 53 and 54, and the third one determined by the length of a total path consisting of the three sub-paths described above. The first and the second resonant frequencies are higher than the third resonant frequency and contribute to developing a broader frequency range of the radio apparatus 4.

The level of power radiated from the part of the first and the second flexible wires 53 and 54 parallel to the axis of rotation depends on the length of that part. In a case where the part of the first and the second flexible wires 53 and 54 parallel to the axis of rotation is so short that the antenna current does not substantially contribute to radiation while flowing along that part, the effect of broadening the frequency range of the radio apparatus 4 is reduced. It is thus preferable that the length of the part of the first and the second flexible wires 53 and 54 parallel to the axis of rotation is at least a fraction of a wavelength in the band of use, and no less than one-tenth wavelength of the upper end, i.e., the highest frequency of the band of use.

The first connecting spot 50 and the second connecting spot 51 are thus located so that the vector from the first connecting spot 50 to the second connecting spot 51 has a component having a value of no less than one-tenth wavelength of the highest frequency of the band of use. In other words, the second connecting spot 51 is located no less than one-tenth wavelength of the highest frequency of the band of use away from the first connecting spot 50 in a direction parallel to the axis of rotation.

The connecting spots 50 and 51 may be located on the same side of the imaginary plane 6 as long as the above relation of distance between the first and the second connecting spots 50 and 51 is maintained, in a case where a side of the first case 41 joined to the hinge part 13 is long enough.

Figure 14:
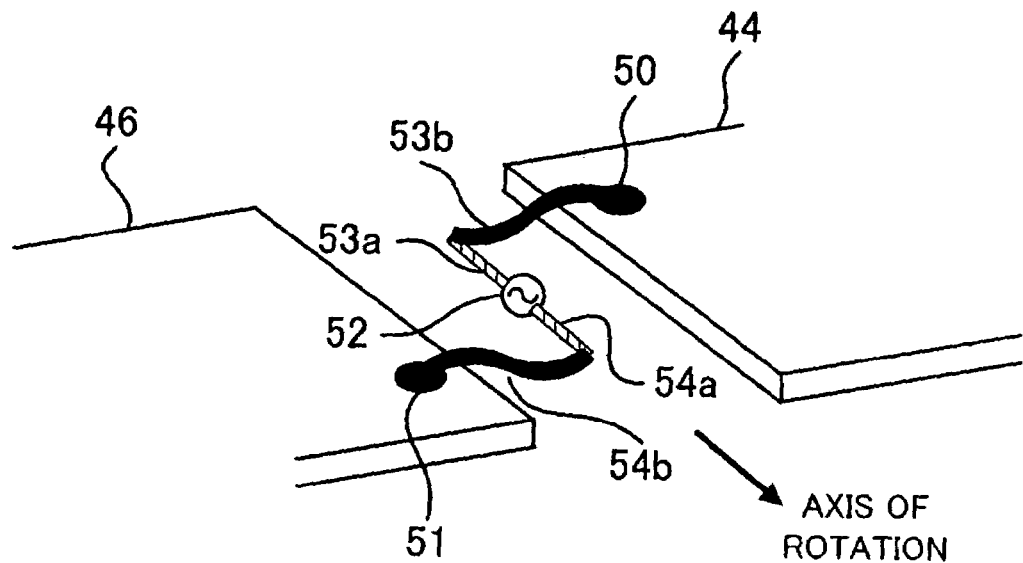
FIG. 14 illustrates a variation of connections around a feeding point in the fifth embodiment.

A variation of the fifth embodiment will be described with reference to FIG. 14, illustrating connections around the feeding point 52 which are modified based on the configuration of the radio apparatus 4 shown in FIG. 10. Each of portions given the reference numeral 44, 46, 50 through 52 and the axis of rotation is a same as the corresponding one shown in FIG. 10 and its explanation is omitted.

In FIG. 14, the first antenna element 45 (not shown) and the feeding point 52 are connected by a conductor including a first portion 53a and a second portion 53b more flexible than the first portion 53a for a signal connection. The second antenna element 47 (not shown) and the feeding point 52 are connected by a conductor including a first portion 54a and a second portion 54b more flexible than the first portion 54a for a return connection. The first portions 53a and 54a may be made rigid and straight in a direction parallel to the axis of rotation.

This arrangement is suitable for the open and close structure of the first and the second cases 51 and 52 by rotations around the axis of rotation, and may suppress changes of the shape of the connections around the feeding point 52 affecting a characteristic of an antenna formed by the first and the second antenna elements 45 and 47. In FIG. 14, either one of the conductors on both sides of the feeding point 22 may be replaced by, e.g. the first or the second flexible wire 53 or 54 shown in FIG. 10.

Figure 15:
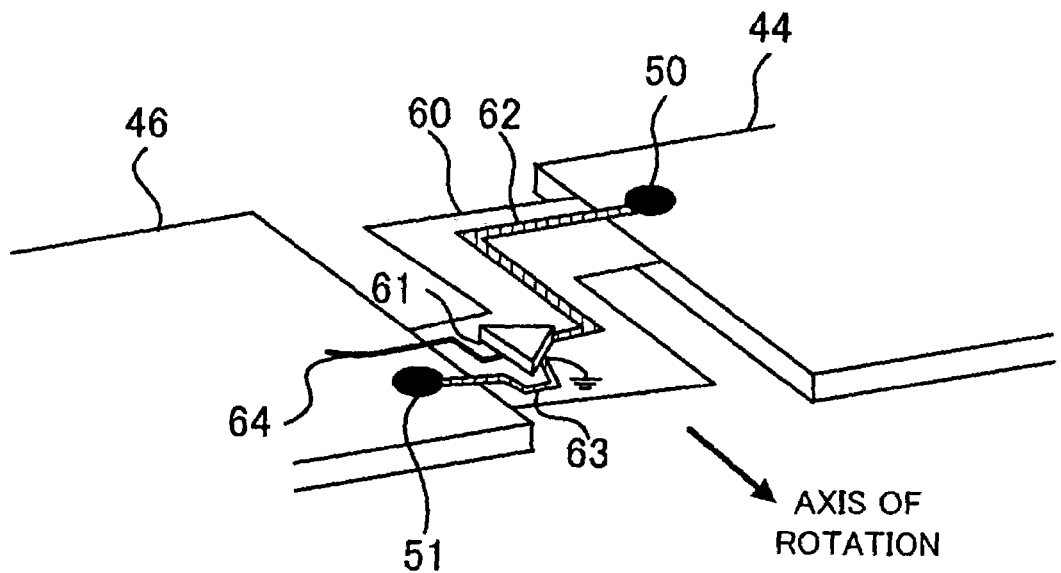
FIG. 15 illustrates a variation of connections around a radio circuit in the fifth embodiment.

Another variation of the fifth embodiment will be described with reference to FIG. 15, illustrating an arrangement and connections around the radio circuit which are modified based on the configuration of the radio apparatus 4 shown in FIG. 10. Each of portions given the reference numeral 44, 46, 50, 51 and the axis of rotation is a same as the corresponding one shown in FIG. 10 and its explanation is omitted.

The first PCB 44 and the second PCB 46 are connected with a flexible PCB 60, and a radio circuit 61 is mounted on the flexible PCB 60. The flexible PCB 60 is, e.g., a rigid-flexible PCB that is configured to enable active or passive components to be mounted thereon.

The flexible PCB 60 has a first printed pattern 62 to connect the first connecting spot 50 and the radio circuit 61 for a signal connection, and has a second printed pattern 63 to connect the second connecting spot 51 and the radio circuit 61 for a return connection. A signal input may be applied to the radio circuit 60 from the second PCB 46, or possibly from the first PCB 44, through a signal line 64.

In FIG. 15, the first antenna element 45 (not shown) and the second antenna element 47 (not shown) form an antenna equivalent to the antenna similarly formed in FIG. 10 or FIG. 14, while the signal line 64 conveying a small signal is pulled into the hinge part 43 (not shown) instead of the feeder line 49 shown in FIG. 10 due to mounting the radio circuit 61 on the flexible PCB 60. That helps simpler wiring and reduction of feeder loss.

Another variation of the fifth embodiment may be considered by modifying the configuration shown in FIG. 10 as follows (not shown). In this variation, the feeding point 52 is not in the hinge part 43 but near the second connecting spot 51, and the flexible wire 54 is removed. The flexible wire 53 crosses the hinge part 43 and is connected to a signal line of the feeder line 49. A return line of the feeder line 49 is directly connected to the second antenna element 47 at the second connecting spot 51. This variation is a combination of the configurations shown in FIG. 7 and FIG. 10. The flexible wire 53 may be formed as a printed pattern of a flexible PCB as shown in FIG. 8.

Figure 16:
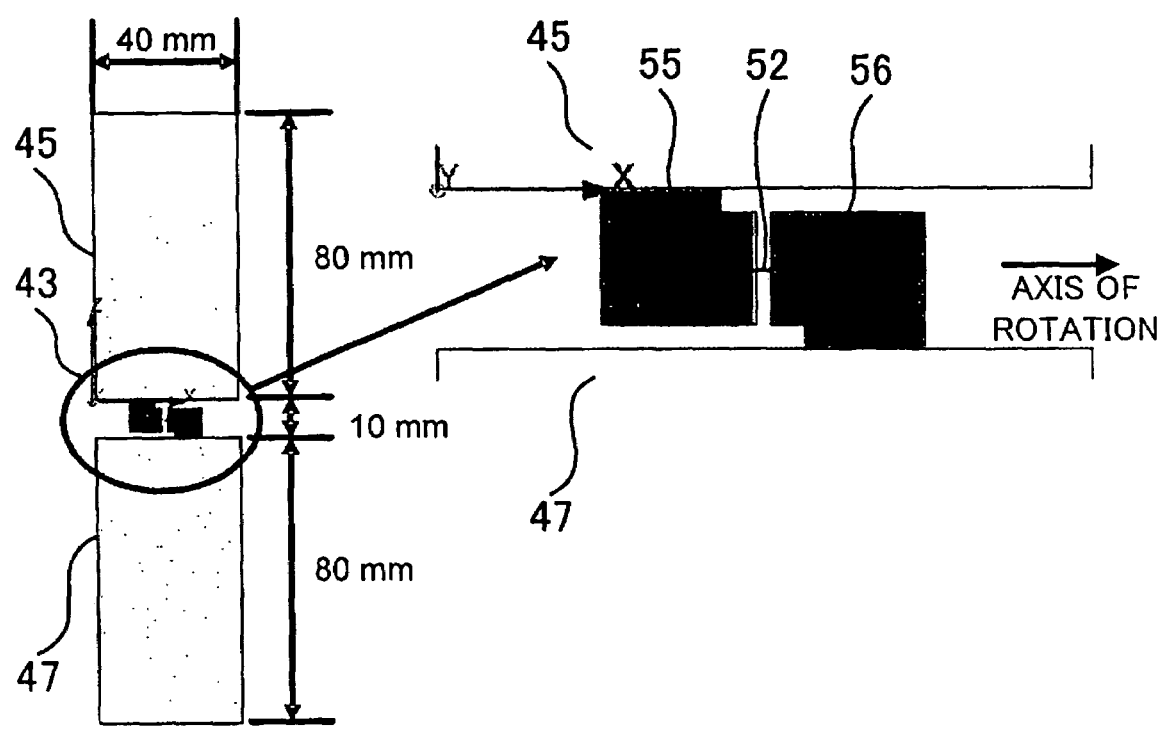
FIG. 16 illustrates a configuration for evaluating an effect of the fifth embodiment.

A configuration for evaluating an effect of the fifth embodiment is shown in FIG. 16, where the left side drawing shows relative locations among the first antenna element 45, the second antenna element 47 and the hinge part 43, and their dimensions. The right side drawing illustrates that the first antenna element 45 and the second antenna element 47 are fed from the feeding point 52 located between two conductors 55 and 56, each of them is L-shaped and wider than, e.g., the first and the second flexible wires 53 and 54 shown in FIG. 10. There shows an axis of rotation in FIG. 16 as in FIG. 10 through FIG. 15.

Figure 17:
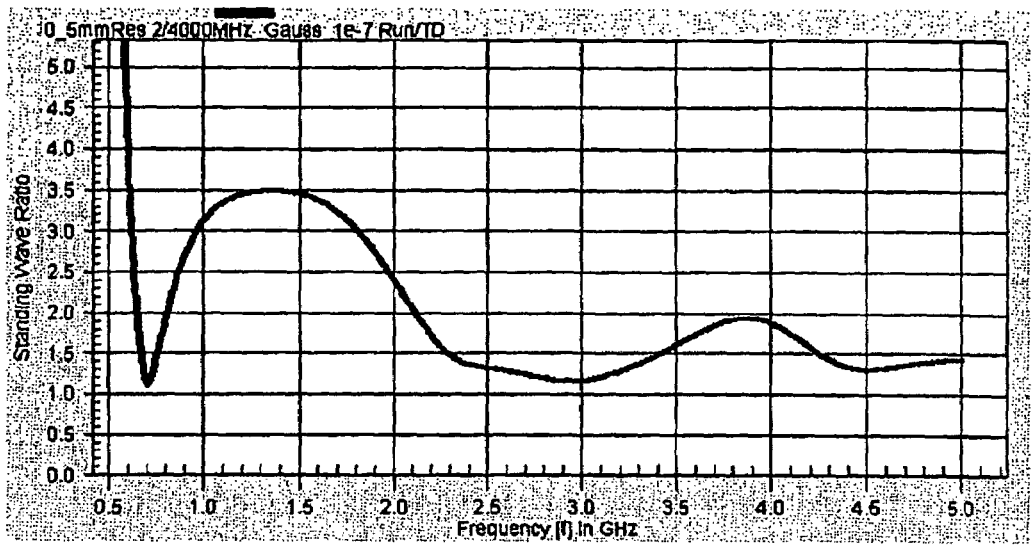
FIG. 17 shows a VSWR (voltage standing wave ratio)-frequency characteristic in the configuration shown in FIG. 15.

A VSWR-frequency characteristic of an antenna formed by the first and the second antenna elements 45 and 47 and fed from the feeding point 52 shown in FIG. 16 is calculated and shown in FIG. 17. The horizontal axis shows a frequency range of 0.5 to 5 GHz. The vertical axis shows a VSWR viewed at the feeding point 52.

Figure 18:
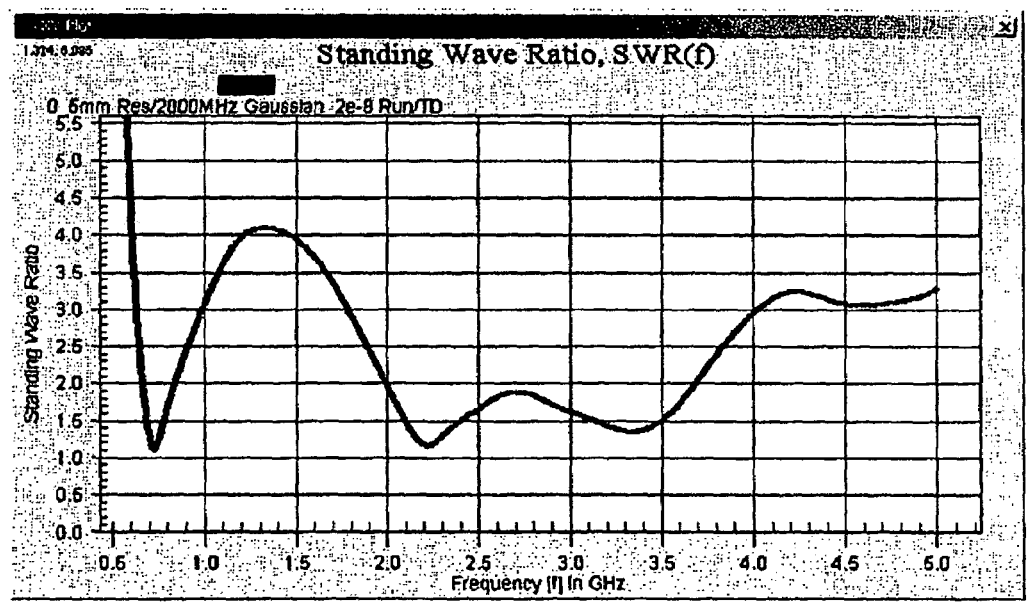
FIG. 18 shows a VSWR-frequency characteristic in a configuration different from the configuration shown in FIG. 17.

FIG. 18 shows another VSWR-frequency characteristic of an antenna formed by the first and the second antenna elements 45 and 47 each of which is connected to the feeding point 52 with a straight wire, not an L-shaped conductor. The horizontal and the vertical axes are the same as those shown in FIG. 17.

The VSWR-frequency characteristic of FIG. 17 is better than that of FIG. 18, particularly at 3.5 GHz or higher frequencies. This is due to a resonant frequency determined by the lengths of the conductors 55 and 56 in a direction parallel to the axis of rotation.

According to the fifth embodiment described above, broadening an antenna frequency range of a radio apparatus having two cases may be developed in a case where the two cases are closed to each other, by separating the two connecting spots.

Figure 19:
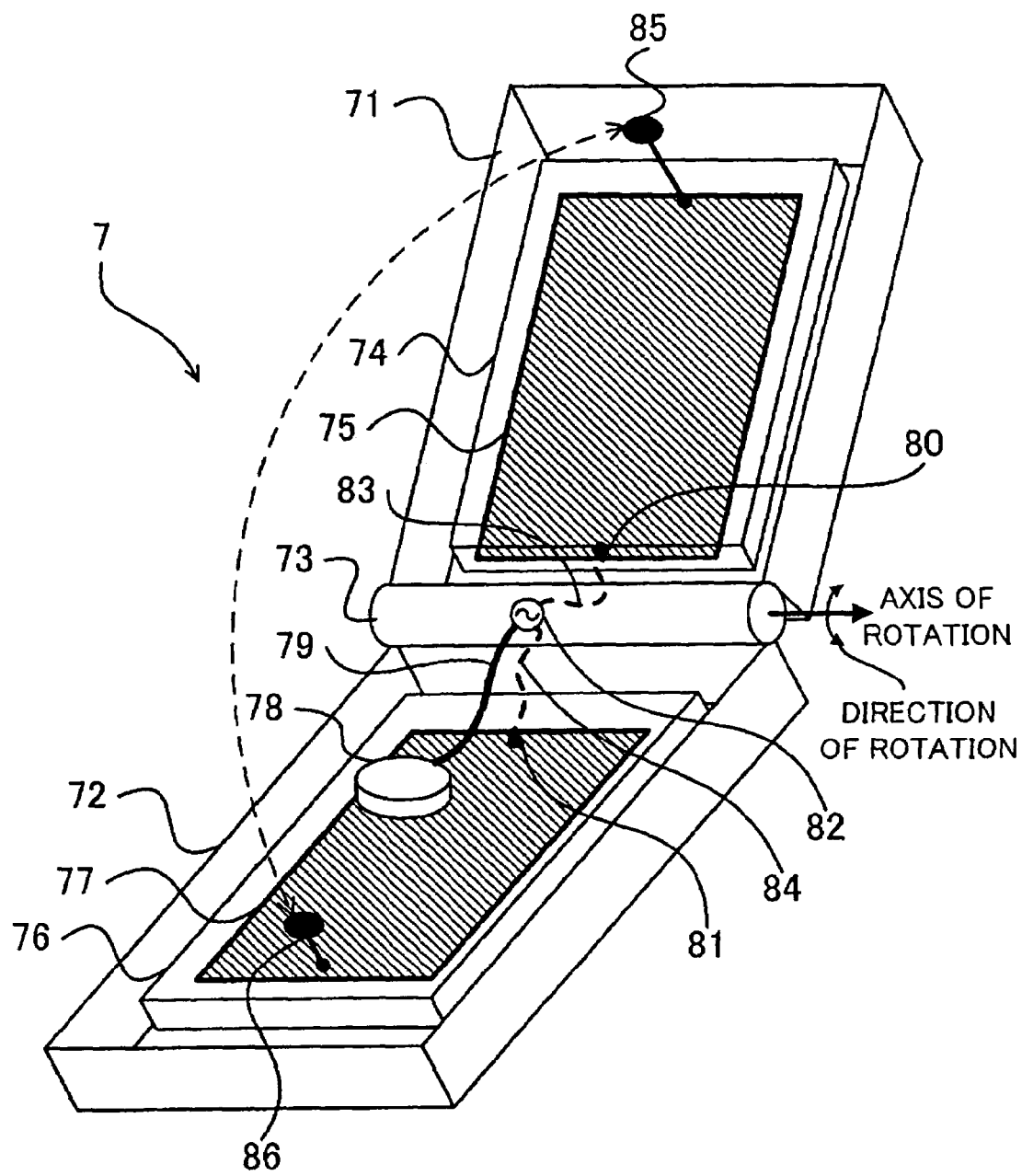
FIG. 19 illustrates a configuration of a main part of a radio apparatus in a sixth embodiment of the present invention.

A sixth embodiment of the present invention will be described with reference to FIG. 19 and FIG. 20. FIG. 19 is a perspective view of a main part of a radio apparatus 7 in the sixth embodiment. The radio apparatus 7 is usable in a frequency band i.e., a band of use. The radio apparatus 7 has a first case 71, a second case 72 and a hinge part 73.

The first case 71 and the second case 72 are joined via the hinge part 73 and configured to open and close to each other in a manner that the first case 71 rotates against the second case 72 around an axis of rotation, which is parallel to a side of the first case 71 joined to the hinge part 73. The hinge part 73 may be provided with another axis of rotation (not shown) so that the first case 71 may be turned over and closed to the second case 72.

FIG. 19 shows an internal configuration of the first case 71 that contains a first PCB 74 having a first antenna element 75 formed as a printed pattern of the first PCB 74. The first antenna element 75 may be formed as a ground pattern of the first PCB 74. The first antenna element 75 may be formed on the front or the back face of the first PCB 74, or in a case where the first PCB 74 is multiple-layered, on a middle layer.

FIG. 19 shows an internal configuration of the second case 72 that contains a second PCB 76 having a second antenna element 77 formed as a printed pattern of the second PCB 76. The second antenna element 77 may be formed as a ground pattern of the second PCB 76. The second antenna element 77 may be formed on the front or the back face of the second PCB 76, or in a case where the second PCB 76 is multiple-layered, on a middle layer.

In FIG. 19, a radio circuit 78 is contained in the second case 72, e.g., mounted on the second PCB 76. The radio circuit 78 is a same as the radio circuit 18 shown in FIG. 1, and may be contained not in the second case 72 but in the first case 71 or in the hinge part 73.

In FIG. 19, a feeder line 79 is connected to the radio circuit 78 and goes toward the hinge part 73. The feeder line 79 is a same as the feeder line 19 shown in FIG. 1, and is connected to the radio circuit 79 as described in the previous embodiments. The first antenna element 75 has a first connecting spot 80. The second antenna element 77 has a second connecting spot 81. The feeder line 79 ends at a feeding point 82.

The feeding point 72 feeds radio signals through a first connecting member, e.g., a first flexible wire 83, via the first connecting spot 80 to the first antenna element 75. Its return path is from the second antenna element 77, via the connecting spot 81 and through a second connecting member, e.g., a second flexible wire 84 to the feeding point 82. Connections among the first and the second antenna elements 75 and 77, the radio circuit 78 and the feeding point 82 may be arranged according to the previous embodiments.

The first case 71 has a first shorting member, a first conductive piece 85 e.g., on a face that faces toward the second case 72 in a case where the first and the second cases 71 and 72 are closed to each other. The first conductive piece 85 is connected to the first antenna element 75.

The second case 72 has a second shorting member, a second conductive piece 86 e.g., on a face that faces toward the first case 71 in a case where the first and the second cases 71 and 72 are closed to each other. The second conductive piece 86 is connected to the second antenna element 77.

The second conductive piece 86 is located in a manner that the first and the second conductive pieces 85 and 86 short-circuit in a case where the first and the second cases 71 and 72 are closed. That is illustrated with a dashed arc in FIG. 19. Here, to short-circuit means to be in direct contact, or electrostatic or electromagnetic coupling.

In FIG. 19, the first conductive piece 85 is located near an end of the first case 71 farthest from the hinge part 73. The second conductive piece 86 is located near an end of the second case 72 farthest from the hinge part 73. The first conductive piece 85 may be located on or around a point where an electric field is rendered strongest in the first antenna element 75 when a radio signal is fed to the first antenna element 75.

The first conductive piece 85 may be located around and connected to any point in the first antenna element 75, and the second conductive piece 86 may be located around and connected to any point in the second antenna element 77, as long as the first and the second conductive pieces 85 and 86 short-circuit in a case where the first and the second cases 71 and 72 are closed.

Short-circuiting of the first and the second conductive pieces 85 and 86 forms a kind of a stub that may improve the impedance matching of an antenna formed by the first and the second antenna elements 75 and 77.

An antenna characteristic of the radio apparatus 7 will be described with reference to FIG. 20 that is drawn in a form of a side view in a case where the first and the second cases 71 and 72 are closed. Each of portions shown in FIG. 20 is a same as the corresponding one shown in FIG. 19 given the same reference numeral and its explanation is omitted. The first conductive piece 85 and the second conductive piece 86 short-circuit in FIG. 20.

Figure 20:
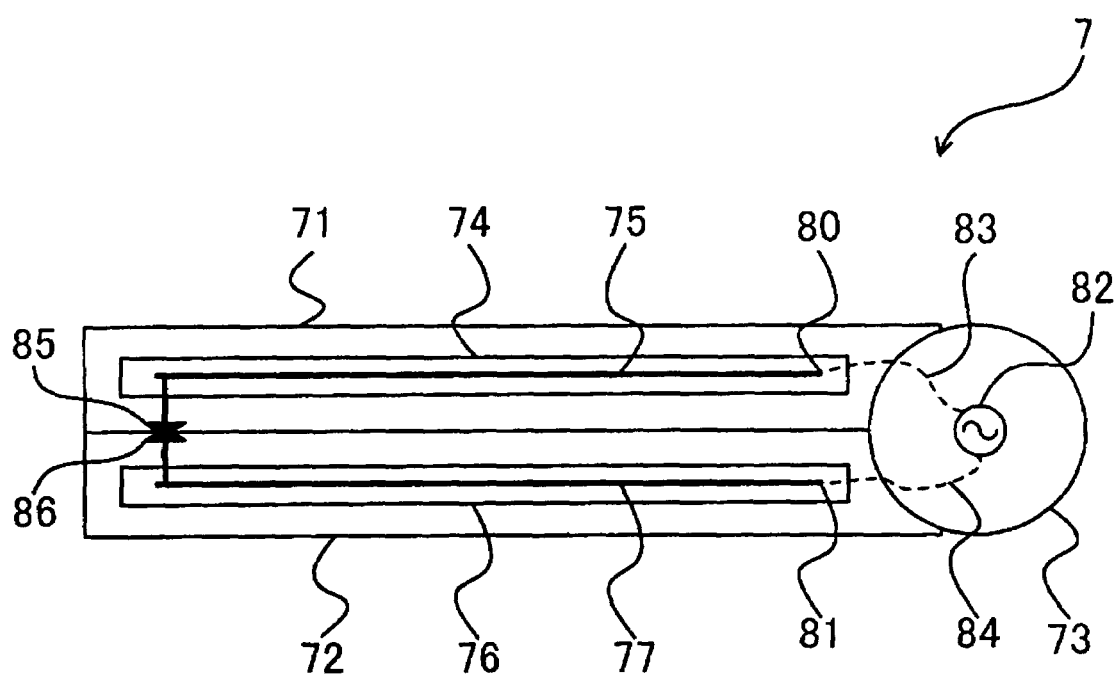
FIG. 20 is a side view of the configuration of the radio apparatus shown in FIG. 18 being closed.

In FIG. 20, a forward line is formed by the first antenna element 75 and the first flexible wire 83, and a backward line is formed by the second antenna element 77 and the second flexible wire 84. They are fed by the feeding point 82 and short-circuit at the end. This is equivalent to loading a capacitance of an indefinite value at the end of the forward and the backward lines.

Without short-circuiting at the end, an antenna current flows through the first antenna element 75 and through the second antenna element in opposite directions, which degrades radiation efficiency of an antenna formed by the first and the second antenna elements 75 and 77.

The impedance of the antenna formed by the first and the second antenna elements 75 and 77 is affected by constants distributed along the first and the second antenna elements 75 and 77, which depends on each product of the radio apparatus 7. Such effects of distributed constants and dependence on each product will be reduced by loading a capacitance of an indefinite value, i.e., short-circuiting at the end.

In FIG. 19, the first conductive piece 85 is drawn as a spot. That may be shaped to have some width or area, or on one or more edges of a polygon. In these cases, the second conductive piece 86 has to be located and shaped to coincide with the location and the shape of the first conducting piece 85.

The first case 71 may be turned over and closed to the second case 72 as described earlier. In such a case, a back face of the first case 71 faces toward the second case 72. The radio apparatus 7 may be modified so that the one case has a shorting member on each of two or more faces thereof that faces toward the other case when they are closed.

According to the sixth embodiment described above, the first and the second antenna elements form a forward and a backward lines short-circuiting at the end, which contributes to improving radiation efficiency and reducing dependence on each product of the antenna characteristic.

The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:

1. A radio apparatus comprising:
   a fist case containing a first printed circuit board;
   a second case containing a second printed circuit board;
   a hinge part joining the first case and the second case, the first case and the second case being configured to open and close to each other;
   a radio circuit being contained in one of the first case, the second case and the hinge part;
   a feeder line being connected to the radio circuit at a first end thereof, having a feeding point at a second end thereof, and including a signal line and a return line between the first end and the second end;
   a first antenna element being formed as a printed pattern of the first printed circuit board;
   a first conductor connecting the first antenna element to the signal line at the feeding point;
   a second antenna element being formed as a printed pattern of the second printed circuit board; and
   a second conductor connecting the second antenna element to the return line at the feeding point.

2. The radio apparatus of claim 1, wherein the first antenna element is formed as a ground pattern of the first printed circuit board.

3. The radio apparatus of claim 1, wherein the second antenna element is formed as a ground pattern of the second printed circuit board.

4. The radio apparatus of claim 1, wherein the first conductor has a first portion connected to the signal line at the feeding point and a second portion being more flexible than the first portion and connected to the first antenna element.

5. The radio apparatus of claim 1, wherein the second conductor has a first portion connected to the return line at the feeding point and a second portion being more flexible than the first portion and connected to the second antenna element.

6. The radio apparatus of claim 1 further comprising a flexible printed circuit board connecting the first printed circuit board to the second printed circuit board through the hinge part and including at least one of the feeder line, the first conductor and the second conductor as a printed pattern thereof.

7. The radio apparatus of claim 1 further comprising a flexible printed circuit board connecting the first printed circuit board to the second printed circuit board through the hinge part and including at least one of the first conductor and the second conductor as a printed pattern thereof, wherein the radio circuit is mounted on the flexible printed circuit board.

8. The radio apparatus of claim 1 further comprising a first shorting member located on a first face of the first case and connected to the first antenna element and a second shorting member located on a second face of the second case and connected to the second antenna element, the first face and the second face facing to each other and the first shorting member and the second shorting member short-circuit in a case where the first case and the second case are closed to each other.

9. The radio apparatus of claim 1 further comprising a first shorting member located on a first face of the first case and connected to the first antenna element and a second shorting member located on a second face of the second case and connected to the second antenna element, the first face and the second face facing to each other and the first shorting member and the second shorting member short-circuit in a case where the first case and the second case are closed to each other, wherein the first shorting member is connected around a point of an electric field generated by a radio signal fed to the first antenna element and rendered strongest in the first antenna element.

10. A radio apparatus comprising:
  a fist case containing a first printed circuit board;
  a second case containing a second printed circuit board;
  a hinge part joining the first case and the second case, the first case and the second case being configured to open and close to each other;
  a radio circuit being contained in one of the first case, the second case and the hinge part;
  a feeder line being connected to the radio circuit at a first end thereof, having a feeding point at a second end thereof, and including a signal line and a return line between the first end and the second end;
  a first antenna element being formed as a printed pattern of the first printed circuit board;
  a conductor connecting the first antenna element to the signal line at the feeding point;
  a second antenna element being formed as a printed pattern of the second printed circuit board and connected directly to the return line at the feeding point.

11. The radio apparatus of claim 10 further comprising a flexible printed circuit board connecting the first printed circuit board to the second printed circuit board through the hinge part and including the conductor as a printed pattern thereof.

12. A radio apparatus usable in a frequency band comprising:
  a fist case containing a first printed circuit board;
  a second case containing a second printed circuit board;
  a hinge part joining the first case and the second case, the second case being configured to rotate against the first case around an axis of rotation parallel to a side of the first case joining the hinge part and to open and close to the first case;
  a radio circuit being contained in one of the first case, the second case and the hinge part;
  a feeder line being connected to the radio circuit at a first end thereof, having a feeding point at a second end thereof, and including a signal line and a return line between the first end and the second end;
  a first antenna element being formed as a printed pattern of the first printed circuit board and including a first connecting spot;
  a first conductor connecting the first connecting spot to the signal line at the feeding point;
  a second antenna element being formed as a printed pattern of the second printed circuit board and including a second connecting spot located no less than one-tenth wavelength of the highest frequency of the frequency band away from the first connecting spot in a direction parallel to the assumed axis; and
  a second conductor connecting the second connecting spot to the return line at the feeding point.

13. The radio apparatus of claim 12, wherein the first antenna element is formed as a ground pattern of the first printed circuit board.

14. The radio apparatus of claim 12, wherein the second antenna element is formed as a ground pattern of the second printed circuit board.

15. The radio apparatus of claim 12, wherein the first conductor has a first portion connected to the signal line at the feeding point and a second portion being more flexible than the first portion and connected to the first antenna element.

16. The radio apparatus of claim 12, wherein the second conductor has a first portion connected to the return line at the feeding point and a second portion being more flexible than the first portion and connected to the second antenna element.

17. The radio apparatus of claim 12 further comprising a flexible printed circuit board connecting the first printed circuit board to the second printed circuit board through the hinge part and including at least one of the feeder line, the first conductor and the second conductor as a printed pattern thereof.

18. The radio apparatus of claim 12 further comprising a flexible printed circuit board connecting the first printed circuit board to the second printed circuit board through the hinge part and including at least one of the first conductor and the second conductor as a printed pattern thereof, wherein the radio circuit is mounted on the flexible printed circuit board.

19. The radio apparatus of claim 12 further comprising a first shorting member located on a first face of the first case and connected to the first antenna element and a second shorting member located on a second face of the second case and connected to the second antenna element, the first face and the second face facing to each other and the first shorting member and the second shorting member short-circuit in a case where the first case and the second case are closed to each other.

20. The radio apparatus of claim 12 further comprising a first shorting member located on a first face of the first case and connected to the first antenna element and a second shorting member located on a second face of the second case and connected to the second antenna element, the first face and the second face facing to each other and the first shorting member and the second shorting member short-circuit in a case where the first case and the second case are closed to each other, wherein the first shorting member is connected around a point of an electric field generated by a radio signal fed to the first antenna element and rendered strongest on the first antenna element.

* * * * *